United States Patent
Anderson

(10) Patent No.: US 12,351,034 B2
(45) Date of Patent: Jul. 8, 2025

(54) DIRECTLY SUPPORTED ELECTRIC DRIVE WHEEL SYSTEM AND HYBRID VEHICLE

(71) Applicant: Autonomous Tractor Corporation, St. Michael, MN (US)

(72) Inventor: Terry Anderson, Brookings, SD (US)

(73) Assignee: Autonomous Tractor Corporation, St. Michael, MN (US)

( * ) Notice: Subject to any disclaimer, the term of this patent is extended or adjusted under 35 U.S.C. 154(b) by 293 days.

(21) Appl. No.: 18/125,977

(22) Filed: Mar. 24, 2023

(65) Prior Publication Data

US 2023/0241962 A1 Aug. 3, 2023

Related U.S. Application Data

(63) Continuation-in-part of application No. 17/830,766, filed on Jun. 2, 2022, now abandoned, which is a continuation-in-part of application No. 16/945,487, filed on Jul. 31, 2020, now Pat. No. 11,433,757.

(60) Provisional application No. 62/881,761, filed on Aug. 1, 2019.

(51) Int. Cl.
*B60K 7/00* (2006.01)

(52) U.S. Cl.
CPC .... *B60K 7/0007* (2013.01); *B60K 2007/0092* (2013.01)

(58) Field of Classification Search
CPC .................................................. B60K 7/0007
See application file for complete search history.

(56) References Cited

U.S. PATENT DOCUMENTS

| | | | |
|---|---|---|---|
| 5,509,497 A | 4/1996 | Smith | |
| 6,516,914 B1 | 2/2003 | Andersen et al. | |
| 10,513,186 B1 * | 12/2019 | Shchurovskiy | B60T 13/667 |
| 2004/0163869 A1 * | 8/2004 | Chun | B60T 1/062 |
| | | | 180/209 |
| 2005/0145445 A1 | 7/2005 | Shimizu et al. | |
| 2005/0148423 A1 | 7/2005 | Miller et al. | |
| 2007/0142161 A1 | 6/2007 | Miller | |
| 2008/0283315 A1 | 11/2008 | Suzuki et al. | |
| 2012/0018984 A1 | 1/2012 | Oriet | |
| 2014/0025241 A1 | 1/2014 | Andou et al. | |
| 2018/0056767 A1 * | 3/2018 | Dolgov | B60K 7/0007 |
| 2019/0176517 A1 | 6/2019 | Christy | |
| 2019/0252960 A1 | 8/2019 | Grady | |
| 2020/0276896 A1 | 9/2020 | Kawamura et al. | |
| 2020/0384856 A1 * | 12/2020 | Wang | H02K 7/1846 |
| 2021/0207685 A1 * | 7/2021 | Kameda | F16H 1/32 |

(Continued)

*Primary Examiner* — Erez Gurari
(74) *Attorney, Agent, or Firm* — Kinney & Lange, P.A.

(57) ABSTRACT

A wheel assembly for a vehicle includes a wheel drive having a housing defining an internal volume, an annular rim ring circumferentially disposed about, extending radially through, and rotatable with respect to the housing, a hollow support cylinder extending along a rotational axis of the wheel assembly, and a motor disposed within the internal volume, the motor having a rotor anchored to the rim ring, and a stator disposed radially within the rotor and anchored to the hollow support cylinder, the stator directly abutting and radially supporting the rotor. The wheel assembly further includes a wheel having a rim and a disc, and a tire mounted on the rim. The disc of the wheel is secured to the rim ring such that the rotor, the rim ring, the wheel, and the tire are rotatable about the axis.

20 Claims, 7 Drawing Sheets

(56) References Cited

U.S. PATENT DOCUMENTS

| | | | |
|---|---|---|---|
| 2022/0278586 A1* | 9/2022 | Slingerland | H02K 7/083 |
| 2023/0241962 A1* | 8/2023 | Anderson | H02K 5/225 |
| | | | 180/65.51 |
| 2024/0190238 A1* | 6/2024 | Huber | B60K 17/046 |
| 2025/0067335 A1* | 2/2025 | Kondo | F16H 57/0423 |

* cited by examiner

DIRECTLY SUPPORTED ELECTRIC DRIVE WHEEL SYSTEM AND HYBRID VEHICLE

CROSS-REFERENCE TO RELATED APPLICATION(S)

This application is a continuation-in-part of U.S. application Ser. No. 17/830,766 filed Jun. 2, 2022 for "Tractor Wheel Direct Drive" by T. Anderson, which is a continuation-in-part of U.S. application Ser. No. 16/945,487 (U.S. Pat. No. 11,433,757) filed Jul. 31, 2020 for "Electric Wheel Drive System and Hybrid Vehicle" by T. Anderson and R. Cornelius, which in turn claims the benefit of U.S. Provisional Application No. 62/881,761 filed Aug. 1, 2019 for "Electric Wheel Drive System and Hybrid Vehicle" by T. Anderson and R. Cornelius. The Specifications of U.S. application Ser. Nos. 16/945,487 and 17/830,766 are herein incorporated by reference.

BACKGROUND

The present disclosure is related generally to vehicles, and more particularly to direct drive wheel assemblies for vehicles.

There is an increasing need to transition from internal combustion vehicle engines to alternative propulsion systems, due to the rising cost of fossil fuels and the pollutant byproducts from their use. Industries such as transportation and agriculture are particularly susceptible to the ever-rising costs of fossil fuels, as well as the increased cost and reduced availability of new vehicles and replacement parts for existing vehicles. These industries would benefit from alternative propulsive technology for vehicles, however, such vehicles must also be constructed robustly enough to meet operational demands, such as moving heavy loads and/or operating off road. It is therefore desirable to design alternatively-powered vehicles with improved life cycles to minimize the financial burden on owners and operators.

SUMMARY

A wheel assembly for a vehicle includes a wheel drive having a housing defining an internal volume, an annular rim ring circumferentially disposed about, extending radially through, and rotatable with respect to the housing, a hollow support cylinder extending along a rotational axis of the wheel assembly, and a motor disposed within the internal volume, the motor having a rotor anchored to the rim ring, and a stator disposed radially within the rotor and anchored to the hollow support cylinder, the stator directly abutting and radially supporting the rotor. The wheel assembly further includes a wheel having a rim and a disc, and a tire mounted on the rim. The disc of the wheel is secured to the rim ring such that the rotor, the rim ring, the wheel, and the tire are rotatable about the axis.

A wheel assembly for a vehicle includes a wheel, a tire mounted on the wheel, and a wheel drive secured to a frame of the vehicle. The wheel drive includes a housing defining an internal volume, an annular rim ring circumferentially disposed about, extending radially through, and rotatable with respect to the housing, a hollow support cylinder extending along a rotational axis of the wheel assembly and removably connected to the frame of the vehicle, and a motor disposed within the internal volume. The motor includes a rotor anchored to the rim ring, and a stator disposed radially within the rotor and anchored to the hollow support cylinder, the stator directly abutting and radially supporting the rotor. The stator and the hollow support cylinder are jointly removable from the internal volume of the housing.

Figure 1:
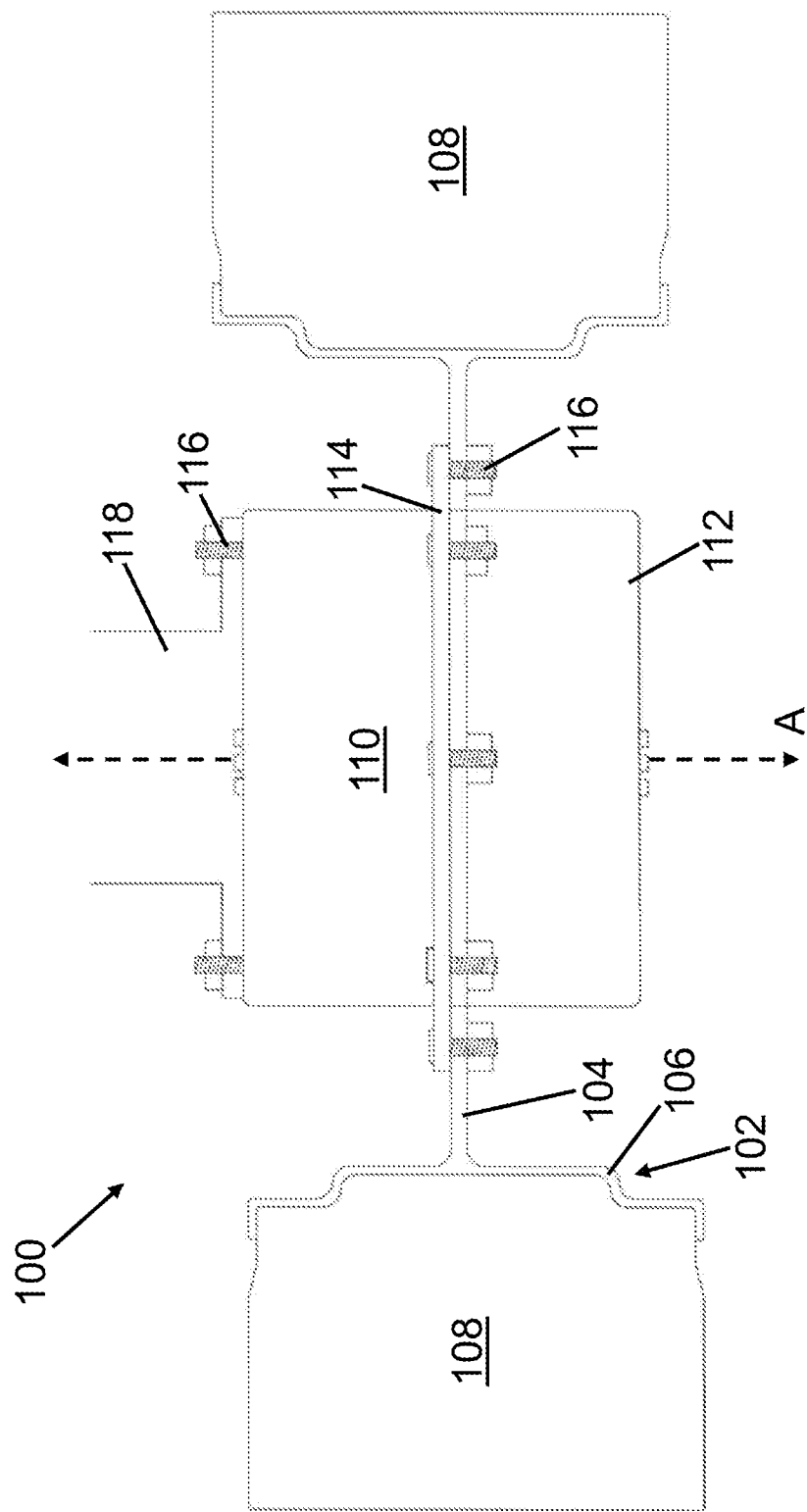
FIG. 1 is a schematic cross-sectional view of a direct drive wheel assembly for a vehicle.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 is a schematic cross-sectional illustration of wheel assembly 100, according to an exemplary embodiment, in which wheel assembly 100 is a vehicle wheel assembly, and in an exemplary embodiment, is a heavy-duty, direct-drive wheel assembly for an agricultural vehicle (e.g., a tractor). Wheel assembly 100 includes wheel 102 having disc 104 and rim 106 generally orthogonal to disc 104. Tire 108 can be mounted on rim 106 such that it is a radially outermost structure relative to axis A. Disc 104 interconnects wheel 102 to wheel drive 110. Wheel drive 110 is disposed concentrically within wheel 102 and includes housing 112 and annular rim ring 114. Disc 104 can be secured to rim ring 114 via threaded fasteners 116 (e.g., nut and bolt), or other suitable means. Wheel drive 110 can also be secured to vehicle frame 118 via threaded fasteners 116. Wheel 102 and tire 108 are rotatable about axis A during operation of the vehicle. Rim ring 114 of wheel drive 110 is also rotatable about axis A, while housing 112 is static with respect to axis A, as is discussed below in greater detail. Wheel 102, housing 112, and rim ring 114 can be formed from a metallic material (e.g., steel) in an exemplary embodiment.

Figure 2:
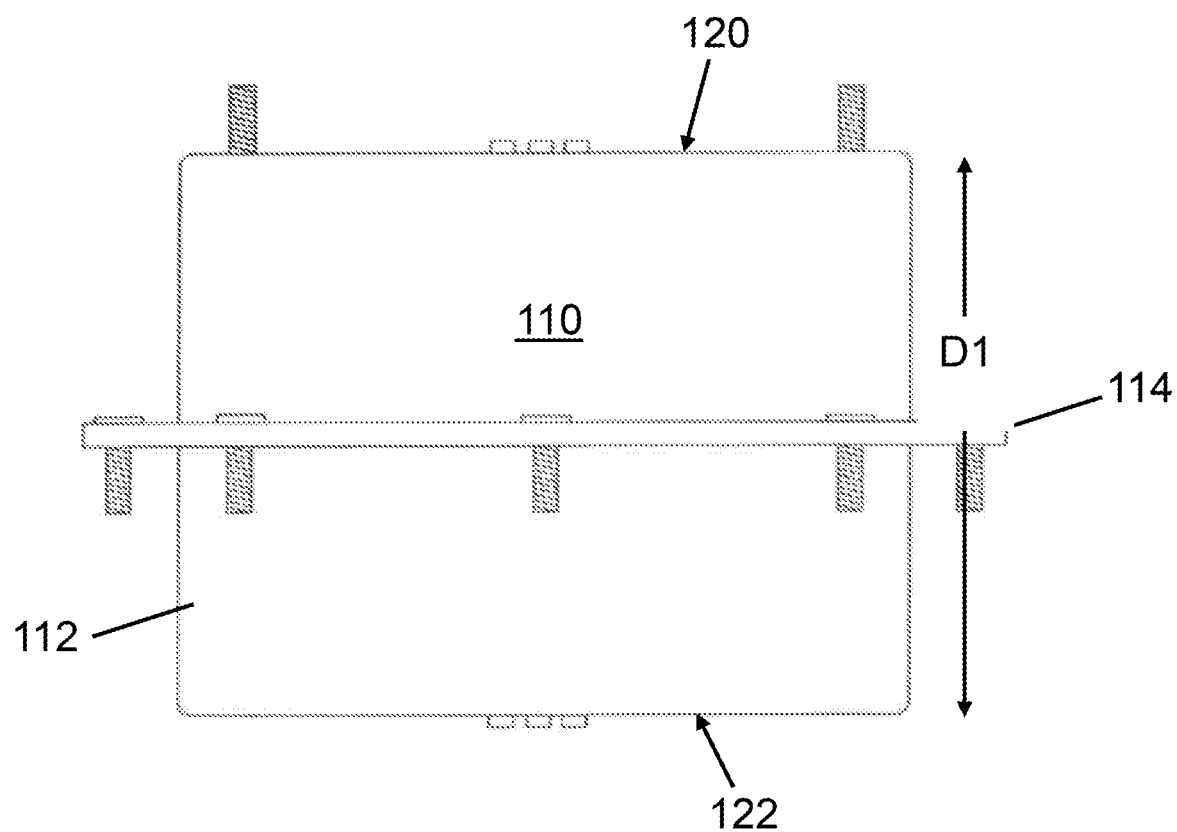
FIG. 2 is a simplified plan view of a wheel drive of the wheel assembly of claim 1.
Figure 3:
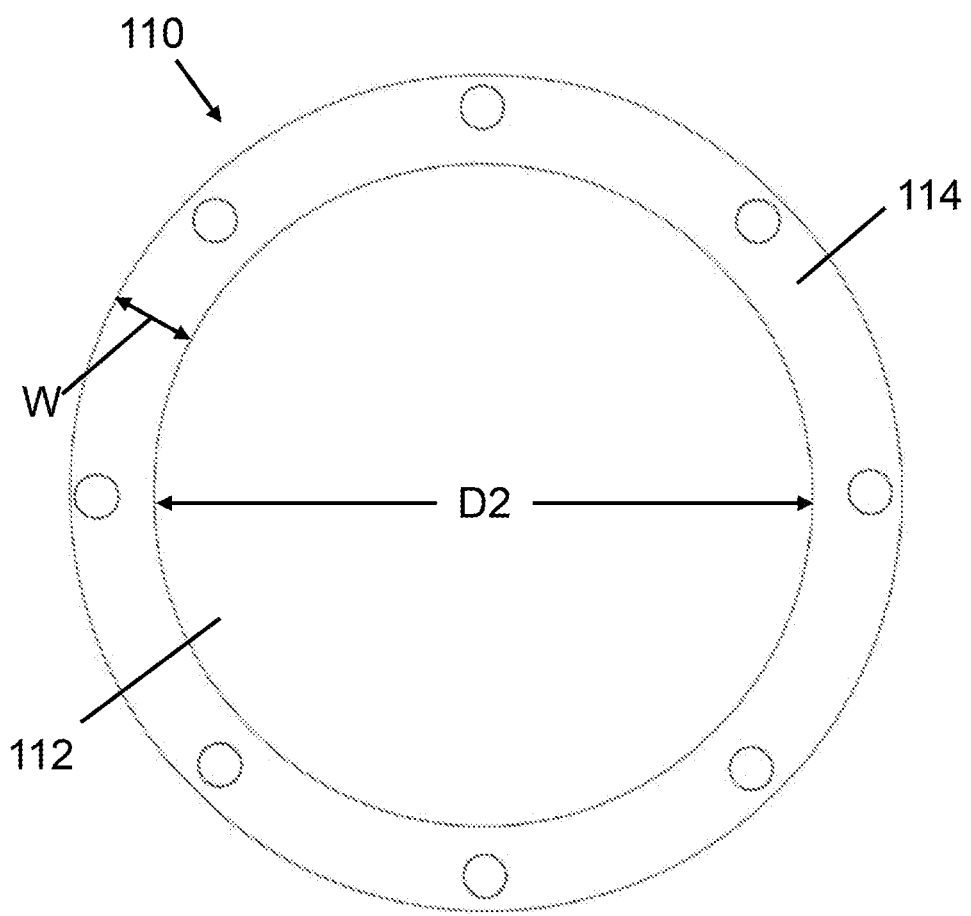
FIGS. 3 and 4 are simplified elevation view of the front and back sides, respectively, of the wheel drive.
Figure 4:
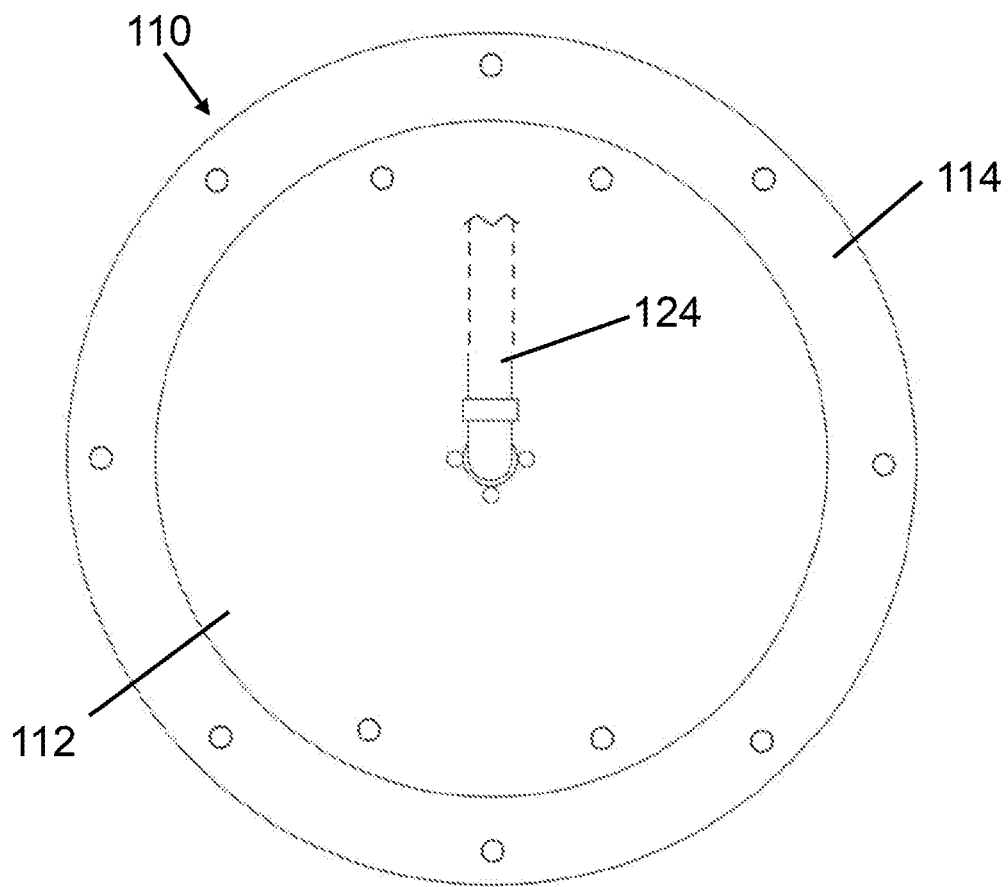

FIGS. 2, 3, and 4 are additional views of wheel drive 110 shown in isolation from wheel 102 and vehicle frame 118. More specifically, FIG. 2 is a plan view of wheel drive 110, FIG. 3 is an elevation view of front (i.e., outward facing) side 120 (labeled in FIG. 2) of wheel drive 110, and FIG. 4 is an elevation view of opposing back (i.e., vehicle-facing) side 122 (labeled in FIG. 2) of wheel drive 110. It should be understood that terms "front" and "back" are relative and can also be referred to as "first" and "second". Cable 124 (FIG. 4) is communication with an internal volume of housing 112, which is shown and discussed in greater detail with respect to FIGS. 5 and 6 below. In FIG. 2, a first dimension (i.e., depth) D1 of housing is shown, while in FIG. 3, a second dimension (i.e., diameter) D2 is shown. Rim ring 114 has a radial width W, shown in FIG. 3, that can be uniform along the circumferential extent of rim ring 114.

Figure 5:
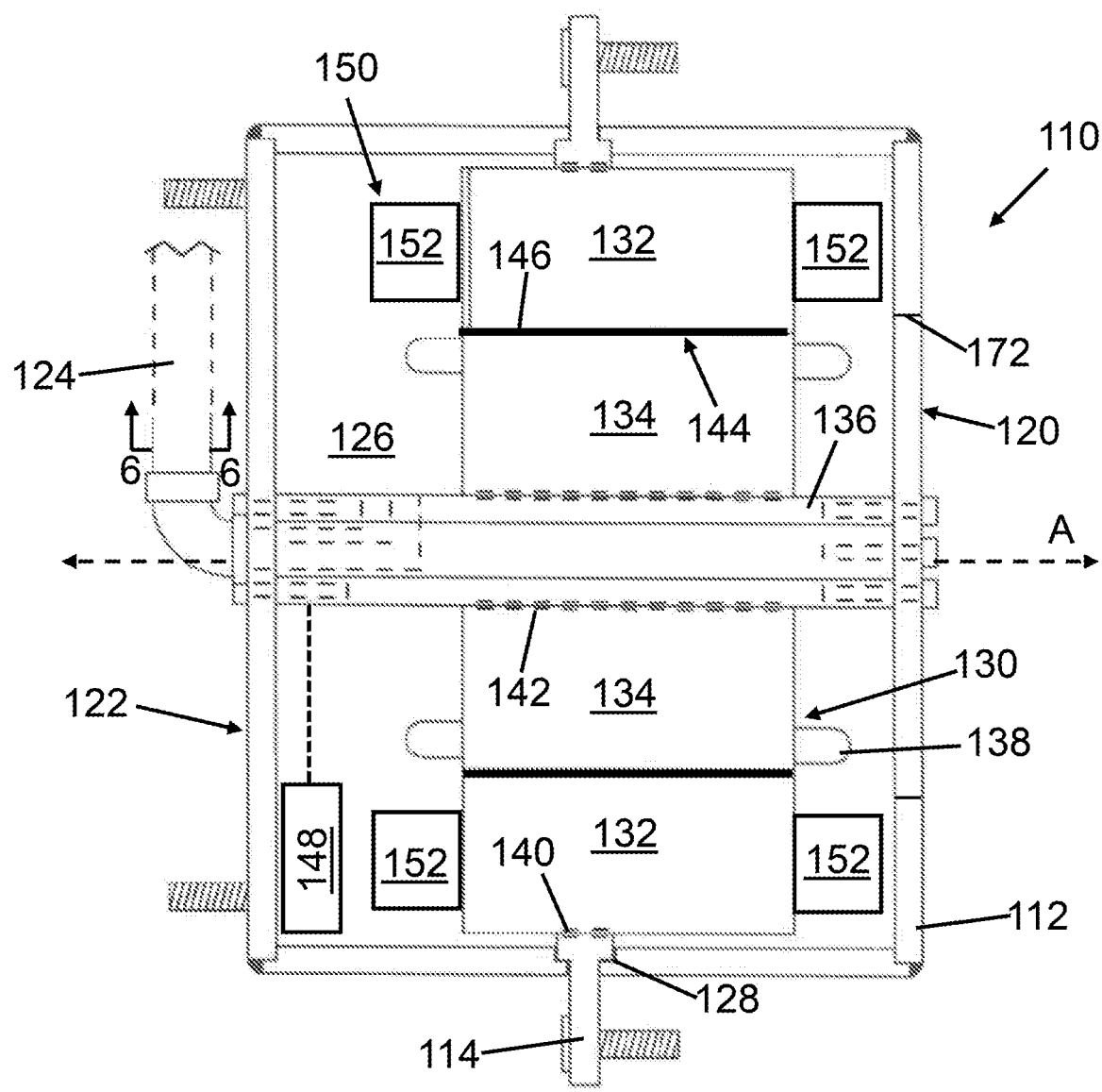
FIG. 5 is a schematic cross-sectional illustration of the wheel drive showing its internal volume.

FIG. 5 is a schematic cross-sectional illustration of wheel drive 110 taken along a plane transverse to front and/or back sides 120, 122. As shown in FIG. 5, housing 112 includes internal volume 126 in which various drive components are situated. Front side 120 of housing 112 includes sealed interfaces 172 discussed in greater detail with respect to FIG. 7. Housing 112 and rim ring 114 are engaged at stepped interface 128 which permits rotation of rim ring 114 about axis A while permitting housing 112 to be generally fluidly sealed with respect to both internal fluids and external moisture. It should be understood that distinct seal elements can be incorporated along stepped interface 128 in some embodiments.

Motor 130 is disposed within internal volume 126. Motor 130 can each be multiphase (e.g., 3-phase) and multipole direct drive motor for driving wheel assembly 100. Motor 130 includes a radially external rotor 132 anchored to rim ring 114, and a radially internal stator 134 disposed concentrically within rotor 132 and anchored to support cylinder 136. Support cylinder 136 is a hollow structure longitudinally disposed along axis A. Support cylinder 136 can serve as both as a structural support and as a housing for supply lines of cable 124, as is discussed in greater detail below. Support cylinder 136 can further be removably secured to frame 118 (FIG. 1). Rotor 132 can be a squirrel-cage rotor and stator 134 can be a wound stator with external windings 138. Rotor 132 is anchored to rim ring 114 via keyed joint 140. As such, rim ring 114 extends radially into housing 112. Stator 134 is similarly anchored to support cylinder 136 via keyed joint 142. Rotor 132 is rotatable about and supported by stator 134 and support cylinder 136. Further, rotor 132 is rotatable with and attached to tire 108 via interconnecting components of wheel 102 and rim ring 114. Rotor 132 abuts stator 134 at interface 144 at the radially innermost surface of rotor 132 and the radially outermost surface of stator 134 with respect to axis A. Interface 144 can include one or more epoxy layers 146 applied to the outer surfaces of one or both rotor 132 and stator 134. Rotor 132 is not otherwise supported by a separate bearing relative to stator 134.

Controller 148 can control actuation of motor 130, as well as monitor and/or command electrical devices within wheel assembly 100. Controller 148 can further be in communication with a master vehicle controller (not shown). Brake assembly 150 is engageable with rotor 132 to prevent or permit rotation of rotor 132. More specifically, brake assembly 150 can be an electric solenoid braking mechanism with multiple brake shoes 152 that can be actuated (e.g., by a spring mechanism) into and out of physical contact with rotor 132.

Figure 6:
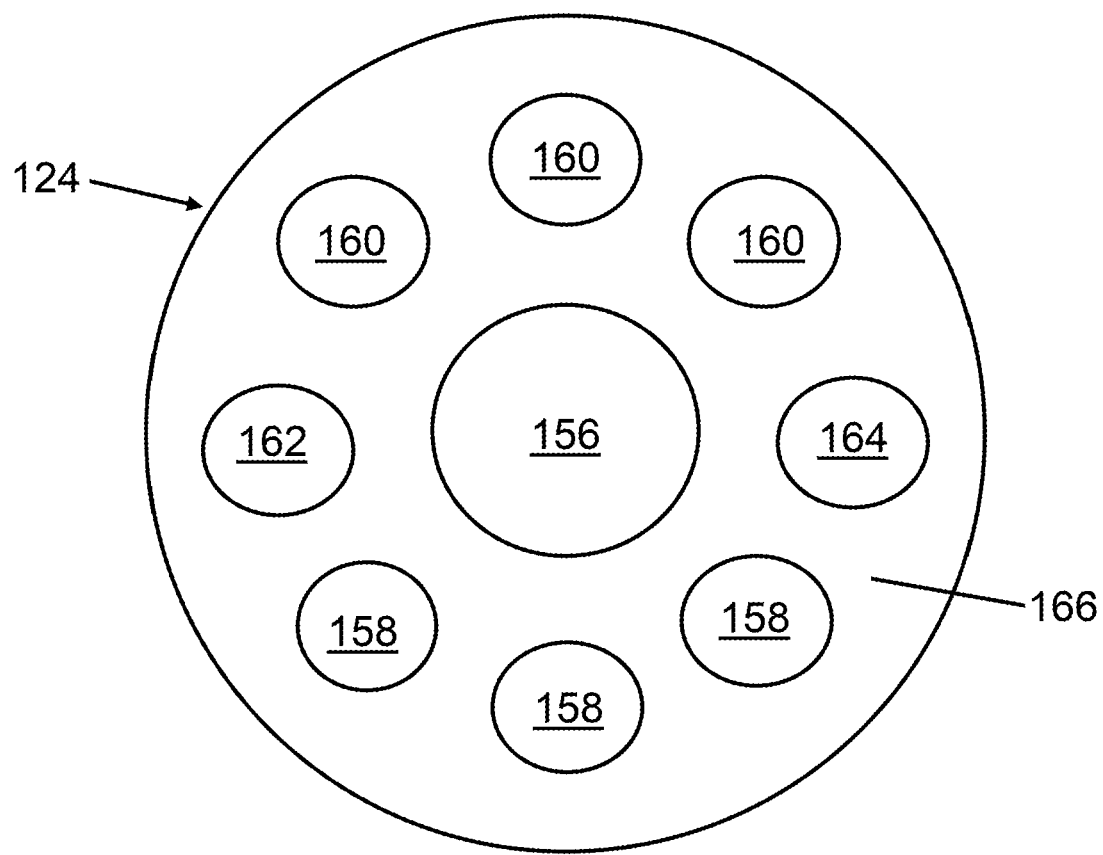
FIG. 6 is a schematic cross-sectional illustration of a wheel drive supply cable.

FIG. 6 is a schematic cross-sectional illustration of cable 124 taken along line 6-6 of FIG. 5 showing multiple internal supply lines. More specifically, cable 124 carries oil, supply line 156, a first set of 3-phase power lines 158, a second set of 3-phase power lines 160, fiber optic line 162, and 12V power line 164. As used herein "oil" can generally refer to lubricating and/or cooling fluids. The various supply lines can extend into and/or interface with corresponding supply lines within support cylinder 136. Oil supply line 156 provides oil from a vehicle reservoir (e.g., a generator) to motor 130 and internal volume 126 of housing 112. Used/return oil can be collected within cable 124 in open space 166 between the various supply lines. Fiber optic line 162 can be in communication with controller 148. Power lines 158 and 160 can provide power to stator 134, while 12V power line 164 can, for example, provide power to controller 148. Power, fiber optics, and/or oil delivered by cable 124 can be further passed through respective corresponding lines extending at least partially through hollow support cylinder 136.

Figure 7:
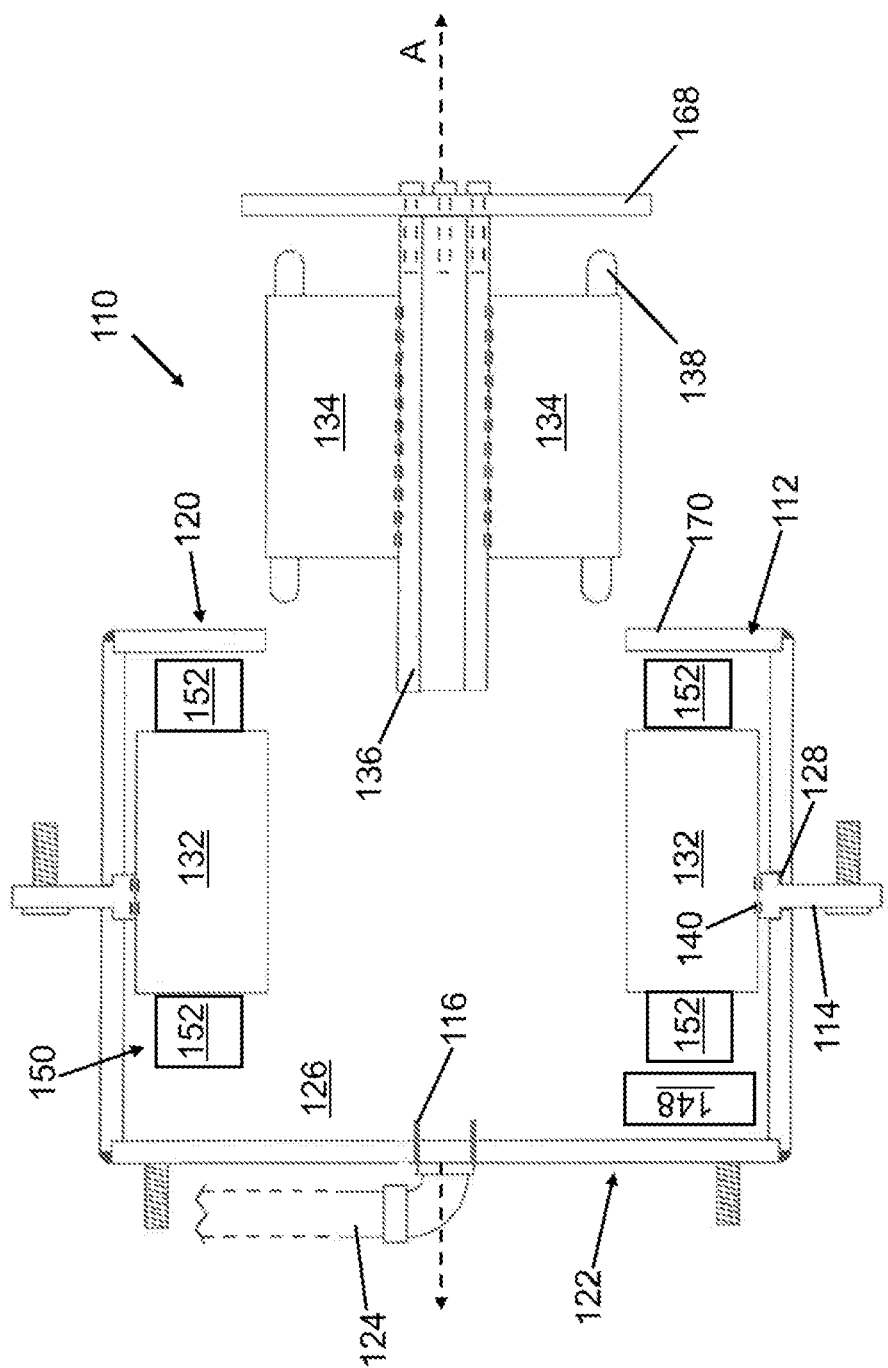
FIG. 7 is a schematic cross-sectional illustration of the wheel drive showing a portion of a motor removed from the internal volume.

FIG. 7 is a schematic cross-sectional illustration of wheel drive 110 similar to the view shown in FIG. 5, except that stator 134 and support cylinder 136 are shown removed from the remainder of wheel drive 110. More specifically, support cylinder 136 can be unfastened (i.e., from threaded fasteners 116) from frame 118 (FIG. 1) and removed, along with stator 134, from internal volume 126 of wheel drive 110. Removal is done via front side 120 of wheel drive 110. As such, the section of housing 112 extending along front side 120 can include removable portion 168, which is removable with stator 134 and support cylinder 136, and non-removable portion 170. When fully assembled, removable and non-removable portions 168, 170 can meet at interface 172 (labeled in FIG. 5). Interface 172 can be suitably fluidly sealed with respect to both internal fluids (e.g., oil) and external moisture. In some embodiments, the entirety of housing 112 coextensive with front side 120 is removable, such that the interface is located at the corners. The removability of stator 134 and support cylinder 136 facilitates maintenance and/or replacement of motor 130, as rotor 132 and stator 134 are more accessible. This similarly facilitates maintenance and/or replacement of other components within internal volume 126 (e.g., brake assembly 150, controller 148, etc.), as the entirety of wheel assembly 100 need not necessarily be removed to access individual components.

One or more wheel assemblies 100 can be mounted on a single vehicle, and each wheel assembly 100 can be independently operable of the other wheel assemblies 100. For a respective wheel assembly 100, motor 130 drives wheel assembly 100 in a forward or reverse direction. Rotational speed and/or direction of a respective wheel assembly 100 need not match the other wheel assemblies 100, and can be based on communications from controllers 148. Individual wheel braking, and/or steering can also be independently adjustable for each wheel assembly 100 as desired by the vehicle operator, or more generally as coordinated centrally by a master vehicle controller. Accordingly, a vehicle using wheel assemblies 100 need not have a conventional engine for motive force, rather, each wheel assembly 100 is capable of producing sufficient horsepower to operate the vehicle. The wheel assembly described herein is suitable for use in large commercial vehicles, recreational vehicles, and traditional passenger vehicles, to name a few non-limiting examples.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wheel assembly for a vehicle, the wheel assembly comprising:
 a wheel drive comprising:
  a housing defining an internal volume;

an annular rim ring circumferentially disposed about, extending radially through, and rotatable with respect to the housing;
a hollow support cylinder extending along a rotational axis of the wheel assembly; and
a motor disposed within the internal volume, the motor comprising:
   a rotor anchored to the rim ring; and
   a stator disposed radially within the rotor and anchored to the hollow support cylinder, the stator directly abutting and radially supporting the rotor;
a wheel comprising:
   a rim; and
   a disc; and
a tire mounted on the rim,
wherein the disc of the wheel is secured to the rim ring such that the rotor, the rim ring, the wheel, and the tire are rotatable about the axis.

2. The wheel assembly of claim 1, wherein the motor is a multiphase direct drive motor.

3. The wheel assembly of claim 2, wherein the rotor is a squirrel-cage rotor, and wherein the stator is a wound stator.

4. The wheel assembly of claim 1, wherein the rotor is anchored to the rim ring via a first keyed joint, and wherein the stator is anchored to the hollow support cylinder via a second keyed joint.

5. The wheel assembly of claim 1, wherein the rim ring engages the housing at a fluidly sealed interface.

6. The wheel assembly of claim 1, wherein a radially innermost surface of the rotor physically abuts a radially outermost surface of the stator at an interface region.

7. The wheel assembly of claim 6, wherein the interface region comprises an epoxy layer applied to at least one of the radially innermost surface of the rotor and the radially outermost surface of the stator.

8. The wheel assembly of claim 1, wherein the wheel drive further comprises:
   a brake assembly engageable with the rotor; and
   a controller.

9. The wheel assembly of claim 8, wherein the brake assembly is an electric solenoid brake assembly.

10. The wheel assembly of claim 8 and further comprising: a cable in communication with the internal volume of the housing.

11. The wheel assembly of claim 9, wherein the cable comprises:
   an oil supply line;
   a plurality of sets of three-phase power lines;
   a fiber optic line; and
   a 12V supply line.

12. The wheel assembly of claim 1, wherein the wheel drive is secured to a frame of the vehicle.

13. The wheel assembly of claim 1, wherein the stator and the support cylinder are jointly removable from the internal volume of the housing.

14. A wheel assembly for a vehicle, the wheel assembly comprising:
a wheel;
a tire mounted on the wheel; and
a wheel drive secured to a frame of the vehicle; the wheel drive comprising:
   a housing defining an internal volume;
   an annular rim ring circumferentially disposed about, extending radially through, and rotatable with respect to the housing;
   a hollow support cylinder extending along a rotational axis of the wheel assembly and removably connected to the frame of the vehicle; and
   a motor disposed within the internal volume, the motor comprising:
      a rotor anchored to the rim ring; and
      a stator disposed radially within the rotor and anchored to the hollow support cylinder, the stator directly abutting and radially supporting the rotor;
   wherein the stator and the hollow support cylinder are jointly removable from the internal volume of the housing.

15. The wheel assembly of claim 14, wherein the wheel further comprises:
   a rim; and
   a disc;
   wherein the tire is mounted on the rim.

16. The wheel assembly of claim 15, wherein the disc is secured to the rim ring such that the rotor, the rim ring, the wheel, and the tire are rotatable about the axis of the wheel assembly.

17. The wheel assembly of claim 14, wherein the rotor is anchored to the rim ring via a first keyed joint, and wherein the stator is anchored to the hollow support cylinder via a second keyed joint.

18. The wheel assembly of claim 14, wherein a radially innermost surface of the rotor physically abuts a radially outermost surface of the stator at an interface region.

19. The wheel assembly of claim 18, wherein the interface region comprises an epoxy layer applied to at least one of the radially innermost surface of the rotor and the radially outermost surface of the stator.

20. The wheel assembly of claim 14, wherein:
the housing comprises a front side opposite the frame of the vehicle;
a section of housing extending along the front side comprises a removable portion and a non-removable portion, the removable portion and the non-removable portion engaging at an interface in an assembled state of the housing; and
the removable portion is removable with the stator and the support cylinder.

* * * * *